United States Patent [19]
Kamei

[11] Patent Number: 5,768,514
[45] Date of Patent: Jun. 16, 1998

[54] COOPERATIVE ACTIVITY SYSTEM AND METHOD

[75] Inventor: Yoichi Kamei, Chofu, Japan

[73] Assignee: Canon Kabushiki Kaisha, Tokyo, Japan

[21] Appl. No.: 563,604

[22] Filed: Nov. 28, 1995

[30] Foreign Application Priority Data

Nov. 30, 1994 [JP] Japan ................................. 6-296996

[51] Int. Cl.$^6$ ................................................. G06F 15/16
[52] U.S. Cl. .................................. 395/200.35; 345/330
[58] Field of Search ................................. 395/800, 821, 395/200.04, 200.34, 200.35; 386/65; 348/15; 364/514 C; 358/335; 345/330

[56] References Cited

U.S. PATENT DOCUMENTS

| | | | |
|---|---|---|---|
| 5,157,511 | 10/1992 | Kawai et al. | 358/335 |
| 5,321,396 | 6/1994 | Lamming et al. | 340/825.49 |
| 5,363,507 | 11/1994 | Nakayama et al. | 395/800 |
| 5,386,581 | 1/1995 | Suzuki et al. | 395/800 |
| 5,390,027 | 2/1995 | Henmi et al. | 358/335 |
| 5,428,774 | 6/1995 | Takahashi et al. | 395/612 |
| 5,546,191 | 8/1996 | Hibi et al. | 358/335 |
| 5,550,965 | 8/1996 | Gabbe et al. | 395/773 |
| 5,564,005 | 10/1996 | Weber et al. | 395/326 |
| 5,572,728 | 11/1996 | Tada et al. | 395/610 |

FOREIGN PATENT DOCUMENTS

WO9221211 11/1992 WIPO.

OTHER PUBLICATIONS

Proceedings ACM Multimedia '94, Proceedings of ACM Multimedia 94, San Francisco, CA, USA, 15–20 Oct. 1994, ISBN 0-89791-686-7, 1994, New York, NY, USA, ACM USA, pp. 227–236, XP000566044, Gabbe J D et al.: "Towards Intelligent Recognition of Multimedia Episodes in Real-Time Applications".

Computer Networks and ISDN Systems, vol. 25, No.8, 1 Mar. 1993, pp. 901–919, XP000339082 Venkat Rangan P: "Video Conferencing, File Storage, and Management in Multimedia Computer Systems".

IEEE Journal on Selected Areas in Communications, vol. 9, No. 9, Dec. 1991, pp. 1395–1404, XP000267530 Venkat Rangan P. et al: "Software Architecture for Integration of Video Services in the Ether-Phone System".

AT&T Technology, vol. 7, No. 3, 1 Jan. 1992, pp. 7–11, CP000324972, Harvey D E et al: "Videoconferencing Systems: Seeing is Believing Visual Communications Lets People Exchange Information Naturally and Collaboratively Wherever They're Located".

*Primary Examiner*—Tod R. Swann
*Assistant Examiner*—Conley B. King, Jr.
*Attorney, Agent, or Firm*—Fitzpatrick, Cella, Harper & Scinto

[57] ABSTRACT

A cooperative activity system, in which a plurality of computer devices are connected via a network, performs an activity by cooperation among the computer devices. A server for recording data is connected to the network and monitors data transferred to the network, creates a keyword conforming to the type of data when the data is transferred and stores the keyword in a file. While data is not being generated, a keyword is created depending upon (1) whether a specific time has arrived, (2) the lapse of time spent in a certain length of a cooperative activity or (3) the passage of a prescribed period of time from an immediately preceding item of data, and both the keyword and the particular event are stored as a file. As a result, desired cooperative activity data can be read out by performing retrieval based upon the keyword.

22 Claims, 11 Drawing Sheets

5,768,514

COOPERATIVE ACTIVITY SYSTEM AND METHOD

BACKGROUND OF THE INVENTION

1. Field of the Invention

This invention relates to a cooperative activity system and method in which data is exchanged via a network to which a plurality of computers are connected.

2. Description of the Related Art

By virtue of recent technical advances in various computers and networks and the rapid popularization thereof, cooperative activity systems are being proposed and put into practice. In such a system, work stations and personal computers are used as terminal devices and processing is executed by a cooperation among a plurality of these devices.

A cooperative activity system of this kind is composed of a shared application group typified by a shared whiteboard system in which data, inputs and outputs are shared, via a network, with the terminal devices (computer devices) participating in the system. Such a system finds use particularly in a television conference system in which a plurality of terminal devices share moving images and voice information.

FIG. 2 is a diagram showing an example of the construction of a cooperative activity system for implementing the arrangement described above.

As shown in FIG. 2, computer devices 16a, 16b, 16c of identical construction are interconnected via a network communication line 17. The construction of computer device 16a will be described by way of example. The computer device 16a includes a central processing unit (CPU) 10 which controls the overall operation of the device in accordance with a control program that has been stored in a memory 13. An output unit 11 includes a display (CRT or LCD), a printing device such as a printer or an audio output device such as a speaker. An input unit 12 includes a keyboard, a pointing device (mouse), a video camera, a microphone, etc. The memory 13 stores a cooperative activity program 18 and the like. An interface (I/F) 14 is for interfacing the network. The components constructing the computer device 16a are interconnected via an internal bus 15.

The computer device 16a in this arrangement sends such data as keyboard inputs, images, audio and control instructions, which have been entered via the input unit 12, to the network communication line 17 via the network interface 14. Data sent to the network communication line 17 from other computer devices is received via the network interface 14, the data is displayed and reproduced by the output unit 11 and control instructions based upon the data are executed. Control instructions include a start/stop instruction for a cooperative activity (a conference, for example), a participation/withdrawal instruction and a start/stop instruction for a shared application program. A video tape recorder or the like is used to record a cooperative activity that uses such a cooperative activity system. Video displayed on the CRT of the computer device and audio are recorded on the video tape recorder and can be reproduced as necessary.

However, in recording using a video tape recorder or the like, all of the information recorded constitutes one recording. Consequently, a special editing operation is essential to extract desired video or audio information from the recording, to fetch recordings of transmissions or processed data on a per-participant basis, and to fetch only recordings of specific applications. In general, information recorded on such video tape does not have retrieval information added on, regardless of the fact that the amount of recorded data is large. In a cooperative activity in such a system, when a participant takes part or withdraws during the course of the activity, or when an application is started up or terminated, becomes an important point in terms of searching for desired video. With a recording made by conventional video tape, however, information relating to operation of the system is not recorded.

Accordingly, information as to operation of the system by individual participants cannot be extracted from the information that has been recorded on the video tape. Further, in order to perform the video tape editing operation efficiently, keyword or tag data is attached to the data which has been recorded on the video tape, before editing is performed. To accomplish this, all of the data that has been recorded on the video tape is dubbed onto another tape, and it is necessary to use the keyword or the like at such time while searching the entirety of the tape. As a result, the editing operation takes time and involves considerable labor.

SUMMARY OF THE INVENTION

An object of the present invention is to provide a cooperative activity system and method in which the contents of an activity are stored successively while keywords are added on as the cooperative activity proceeds, thereby making it possible to readily reproduce the stored activity.

One aspect of the present invention is to provide a cooperative activity system and method in which a keyword can be automatically added onto data generated by a cooperative activity.

Another aspect of the present invention is to provide a cooperative activity system and method in which data is stored in such a manner that it is possible to ascertain, from the file name of the data, the temporal sequence in which the data was generated.

A further aspect of the present invention is to provide a cooperative activity system and method in which a keyword is attached depending upon a control instruction contained in entered data.

A further aspect of the present invention is to provide a cooperative activity system and method in which a keyword to data is attached depending upon the type of entered data.

Still another aspect of the present invention is to provide a cooperative activity system and method in which, when a predetermined period of time elapses, the lapse of this predetermined period of time is adopted as a keyword, and data indicating the elapsed time is stored.

A further aspect of the present invention is to provide a cooperative activity system and method in which, when a predetermined time arrives, this predetermined time is adopted as a keyword, and data indicating the predetermined time is stored.

Another aspect of the present invention is to provide a cooperative activity system and method in which, when a period of time during which data is not generated exceeds a predetermined period of time, a keyword indicating that a participant is thinking is attached, and data indicating this period of time is stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE PREFERRED EMBODIMENTS

Preferred embodiments of the present invention will now be described in detail with reference to the accompanying drawings.

[First Embodiment]

Figure 1:
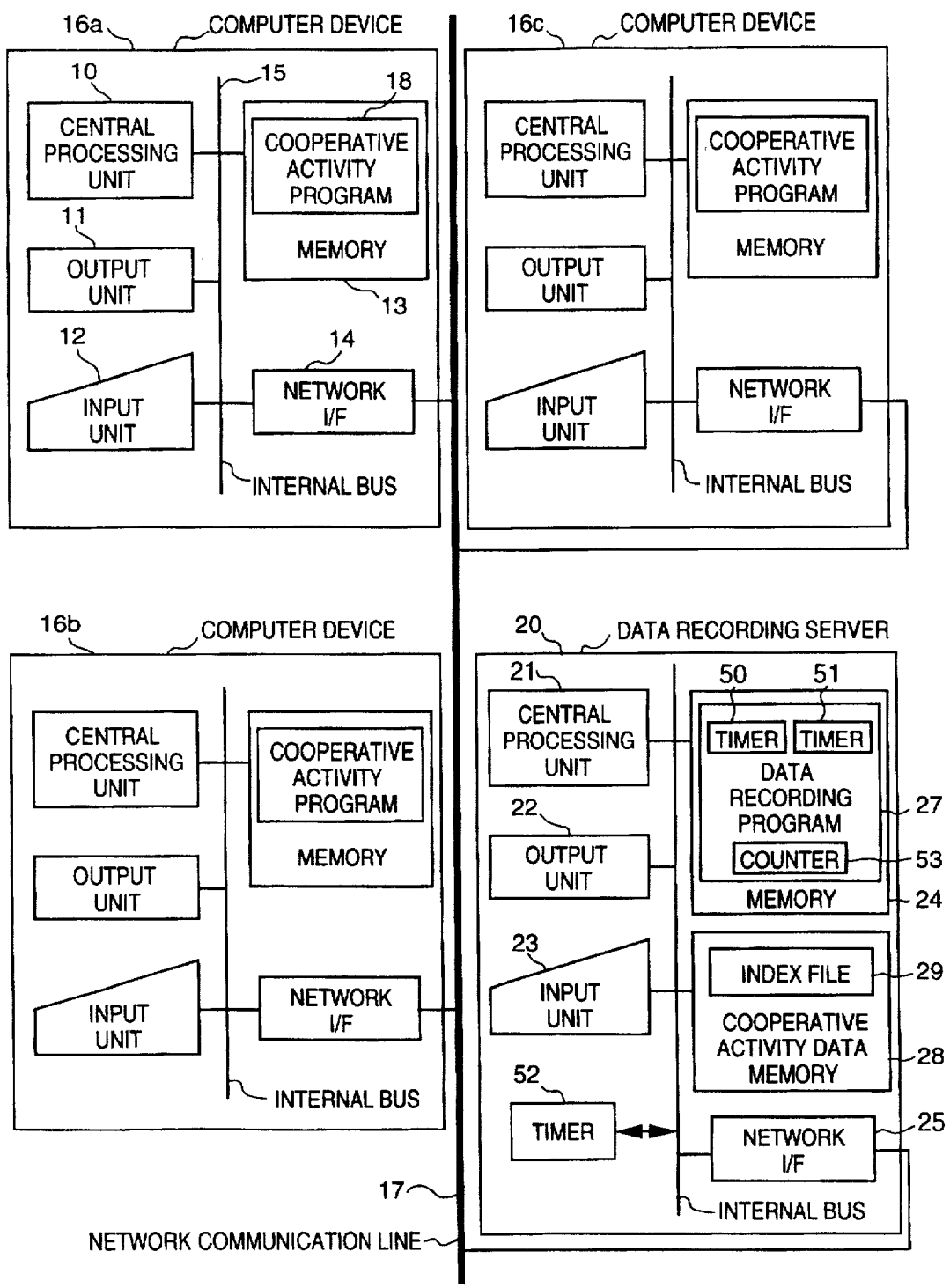
FIG. 1 is a diagram showing the construction of a cooperative activity system according to an embodiment of the present invention.
Figure 2:
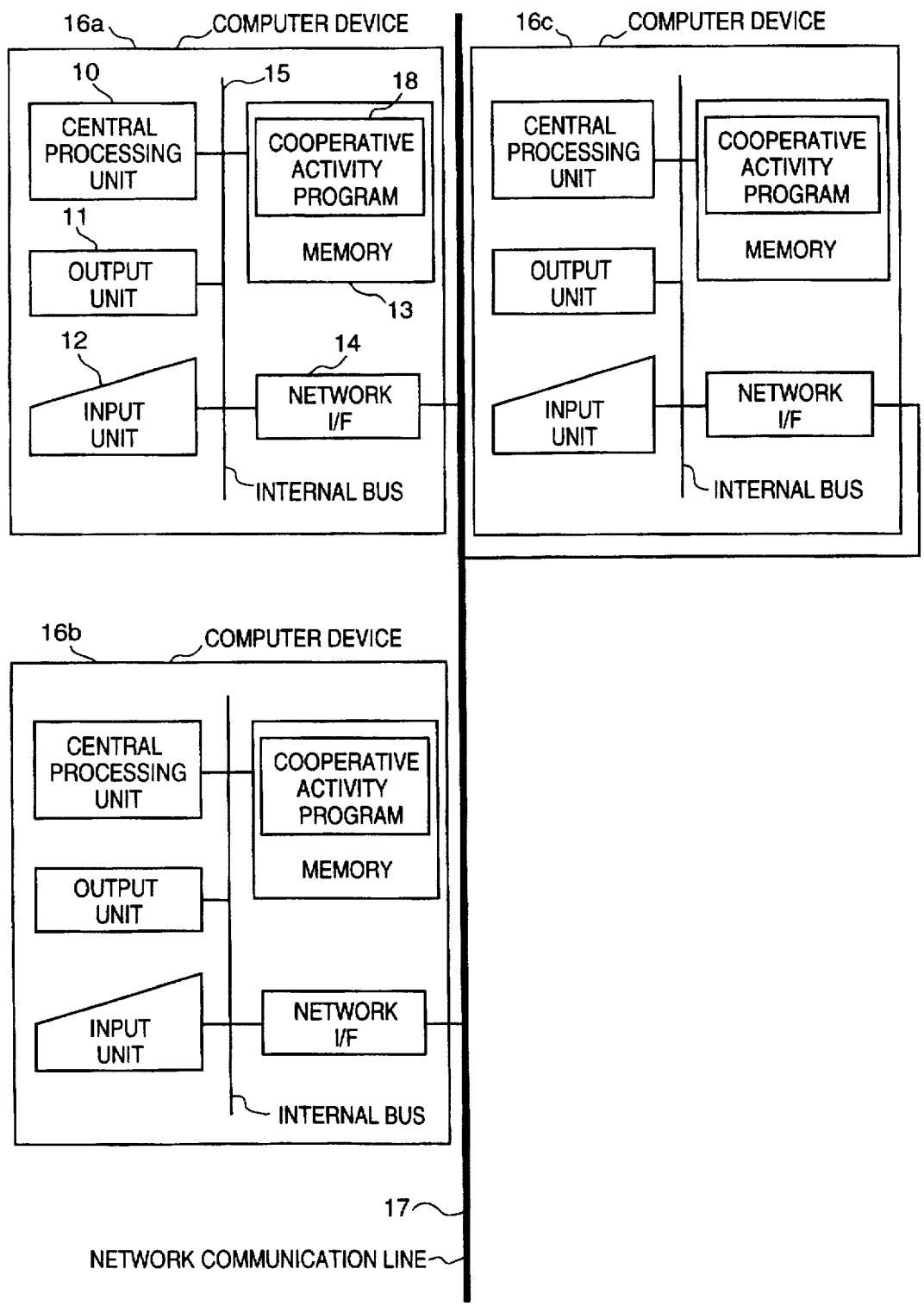
FIG. 2 is a diagram showing the construction of a cooperative activity system according to the prior art.

FIG. 1 is a block diagram showing the construction of a cooperative activity system according to an embodiment of the present invention, in which components similar to those shown in FIG. 2 are designated by the same reference characters and will not be described again.

The system of FIG. 1 includes a data recording server 20 which is a computer device whose construction is substantially the same as that of the computer devices 16a~16c but which has a memory 28 for cooperative activity data. A memory 24 stores a data recording program 27, instead of the cooperative activity program 18 of the other computer devices 16a~16c. The server 20 operates in accordance with this program. An index file 29 storing an index of stored data is stored in the memory 28. An arrangement may be adopted in which the memory 28 for cooperative activity data is provided in the same memory device as that of the memory 24 and the storage area of the memory device may be partitioned, where by the memories 24 and 28 are constructed. A central processing unit (CPU) 21 controls the server 20 in accordance with the data recording program 27. The server 20 has an output unit 22, an input unit 23 and a network interface (I/F) 25 similar to the output unit 11, input unit 12 and network I/F 14, respectively, of the computer devices 16a~16c.

Figure 3:
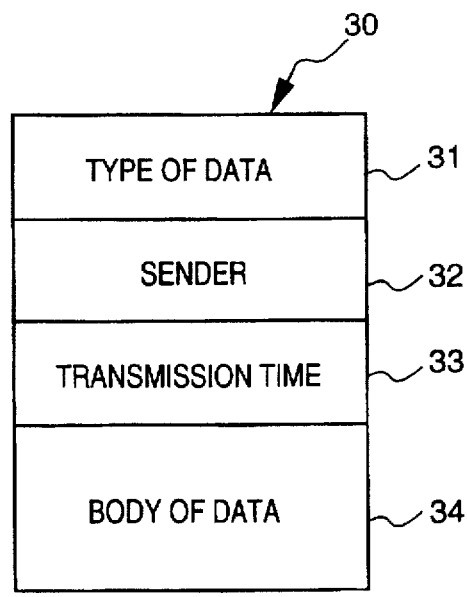
FIG. 3 is a diagram showing the structure of data transferred over a network in this embodiment.

FIG. 3 is a diagram schematically showing an example of the structure (protocol) 30 of data which flows through the network communication line 17.

In FIG. 3, a field 31 indicates the type of data. Information for identifying voice data, image data, instruction data and notification of events is set in the field 31. A field 32 serves as information identifying the sender of data. Information identifying the computer device that sent the data as well as the user (ID) is set in the field 32. A field 33 serves as information indicating data transmission time, and a field 34 indicates the content of the data. It should be noted that this data is stored in the memory 28 of the data recording server 20 just as indicated by the format of FIG. 3.

Figure 4:
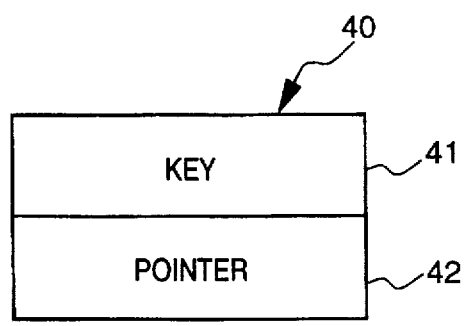
FIG. 4 is a diagram showing the structure of data recorded in a memory according to this embodiment.

FIG. 4 is a diagram schematically illustrating an example of a format 40 of an index stored in the index file 29 of the memory 28 in accordance with the data recording program 27.

In FIG. 4, a field 41 is a key field for storing keywords and tags, and a field 42 is a pointer field in which names of files storing data are stored. Each index is stored in the index file 29 using a technique such as sorting, hashing or a binary-tree method, with the key field 41 serving as a key in order to hasten retrieval. The data recording program 27 has two internal timers 50, 51 for measuring elapsed time. The first timer 50 is an elapsed-time timer which measures passage of time from the start of a cooperative activity and issues an alarm at regular intervals set by the CPU 21. The second timer 51 is a data-interval timer which measures the intervals of the data that flows through the network communication line 17. This timer 51 issues an alarm at regular intervals. The time in both of these timers 50, 51 advances in accordance with time measurement performed by an internal clock (timer 52) within the server 20. Further, the timers 50, 51 are capable of being set and reset independently of each other.

The data recording program 27 saves accepted data in a file in the order in which it has been received. In order to record this sequence, the sequence number is adopted as the file name. In order to hold the sequence number, the data recording program 27 is internally equipped with a counter 53 which holds integral values. The counter 53 is capable of being reset to an initial value and of being incremented at fixed-value units.

The operation of the data recording program 27 in the server 20 of this embodiment will be described in detail with reference to FIGS. 5 and 6.

The two timers 50, 51 are reset at step S1 and the counter 53 is reset to "0" at step S2. The network 17 is monitored by the network I/F 25 at step S3, and it is determined at step S4 whether data has been transferred via the network 17. Processing for detecting whether data has arrived is performed repeatedly until the timer 50 measures elapse of a predetermined period of time at step S17, until a specific time is reached based on timekeeping by the timer 52, or until the data interval timer 51 measures elapse of a predetermined period of time at step S28.

If it is determined at step S4 that data has been transferred, then the program proceeds to step S5, at which the data interval timer 51 is reset. The program then proceeds to step S6, at which the identification field 31 stored in the data is read and it is determined whether the data is a control instruction, such as a start/stop instruction for a cooperative activity, an instruction for addition/deletion of a participant, a start/stop instruction for a shared application, etc. If the answer is "YES" at step S6, the program proceeds to step S7, at which the instruction is regarded as a keyword tag, the keyword tag is written in the key field 41 of the index structure 40 and the value in the counter 53 is written in the pointer field 42. This index is added to the index file 29 using the binary-tree method or the like (step S8). Next, the program proceeds to step S9 at which a file having the value (sequence number) in the counter 53 as its name is created and the received data is written in this file. The value in the counter 53 is incremented at step S10. It is determined at step S11 whether the control instruction is an instruction for ending a cooperative activity. If the answer here is "NO", the program returns to monitoring of the network 17 at step S3. If the answer is "YES" at step S11, then this processing is terminated.

If it is determined at step S6 that the data is other than that of a control instruction, then the program proceeds to step S13. If the data is the type of received data and audio data from a sender, e.g., a participant A, "audio data from A" is adopted as a keyword tag, this is written in the key field 41 of the index structure 40 and the value in counter 53 is written in the pointer field 42. This index is added to the index file 29 using a method such as the binary-tree method (step S14). Next, the program proceeds to step S15 at which a file having the value in the counter 53 as its name is created and the received data is written in this file. The value in the counter 53 is incremented at step S16 and the program returns to monitoring of the network 17 at step S3. If it is determined at step S4 that data has not arrived at the network, then the processing from step S17 (FIG. 6) onward is executed.

In a case where the prescribed period of time, e.g., ten minutes, set in the elapsed-time timer 50 has elapsed and an alarm has been issued by the timer 50, the program proceeds to step S23, where "elapse of ten seconds" from the start of a cooperative activity is adopted as a keyword tag, the keyword tag is set in the key field 41 of the index structure 40 and the value in counter 53 is written in the pointer field 42. The program then proceeds to step S24, at which this index is added to the index file 29 as by using the binary-tree method. The program then proceeds to step S25, at which a file having the value in counter 53 as its name is created. The data type "elapsed time" is written in field 31, the field 32 is left blank, the current time is written in field 33, and data "elapsed time: ten minutes" is written in field 34. Next, at step S26, the counter 53 is incremented. The elapsed-time timer 50 is reset at step S27 and processing returns to the monitoring of the network at step S3.

When an alarm is not generated at step S17, the program proceeds to step S18, at which the timer 52 determines whether the time is a set specific time, e.g., "0 min" or "30 min" every hour. If the answer is "YES", then the program proceeds to step S19, where the absolute time, e.g., 15:30, is adopted as a keyword tag, the keyword tag is set in the key field 41 of the index structure 40 and the value in counter 53 is written in the pointer field 42. The program then proceeds to step S20, at which this index is added to the index file 29 as by using the binary-tree method. The program then proceeds to step S21, at which a file having the value in counter 53 as its name is created. The data type "time" is written in field 31, the field 32 is left blank, the current time is written in field 33, and data "15:30" is written in field 34. Next, at step S22, the counter 53 is incremented and processing returns to the monitoring of the network at step S3.

Furthermore, when a "NO" decision regarding specific time is rendered at step S18, the program proceeds to step S28, where it is determined whether an alarm has been issued from the data-interval timer 51, namely whether the time during which data has not been sent has continued in excess of a predetermined time. If the answer is "YES", the program proceeds to step S29, at which a "rest" keyword tag indicating that the participant is thinking is created. This keyword tag is set in the key field 41 of the index structure 40 and the value in counter 53 is written in the pointer field 42 to produce an index at step S30. This index is added to the index file 29 by using the binary-tree method (for example). The program then proceeds to step S31, at which a file having the value in counter 53 as its name is created.

The data type "rest" is written in field 31, the field 32 is left blank, the current time is written in field 33, and time data indicating "rest" is written in field 34. Next, at step S32, the counter 53 is incremented, the data-interval timer 51 is reset at step S33 and processing returns to the monitoring of the network 17 at step S3.

It should be noted that if "NO" decisions are rendered at all of the steps S17, S18 and S28, the program returns to the monitoring of the network at step S3 and processing is repeated until the cooperative activity ends.

Thus, with regard to data sent to the network 17 from each computer device operating on the basis of the cooperative activity program, file names of sequence numbers are given in order of arrival at the server 20 and the data is stored in the memory 28 as separate files. At the same time, the keyword tags of the sender of data, the type of data, the type of control instruction, elapsed time, absolute time and "rest" are generated automatically without requiring an operation by the participants in the cooperative activity. The keyword tags are stored in the index memory 29 as indices to the files. Using such an index makes it possible to retrieve the relevant file at high speed.

Since data thus stored as a file preserves the data structure (protocol) transferred via the network 17, the results of a cooperative activity can be reproduced in each computer device based upon the data by sending the file to each computer device (cooperative activity program) as is. Furthermore, since files thus created are given names in the order (time series) in which the data is generated, a file neighbored to a file retrieved based upon the index can be obtained with ease. Accordingly, consecutive data files can be sent to each computer device and reproduced as consecutive scenes.

In the embodiment described above, one keyword tag is generated from a plurality of fields. However, it is possible to generate keyword tags from each of a plurality of fields, respectively, and register indices in which the pointer fields 42 are made the same value. Furthermore, an arrangement may be adopted in which the index file 29 is made the same index file even if each field is different. For example, when the index file 29 is created from the sender field of the data, retrieval of the data of a specific sender is performed at high speed. When a chain hashing technique is used to create the index file 29, the indices of each of the senders are connected by pointers in the order of elapsed time. As a result, the extraction of data from a certain sender in order is carried out at high speed.

According to the first embodiment, the data recording server 20 is a computer device other than the computer devices that perform the cooperative activity. However, the cooperative activity program possessed by each computer device can be provided in the memory 24 of the server 20 as well, and the server 20 can also perform the cooperative activity by executing this program.

[Second Embodiment]

Figure 7:
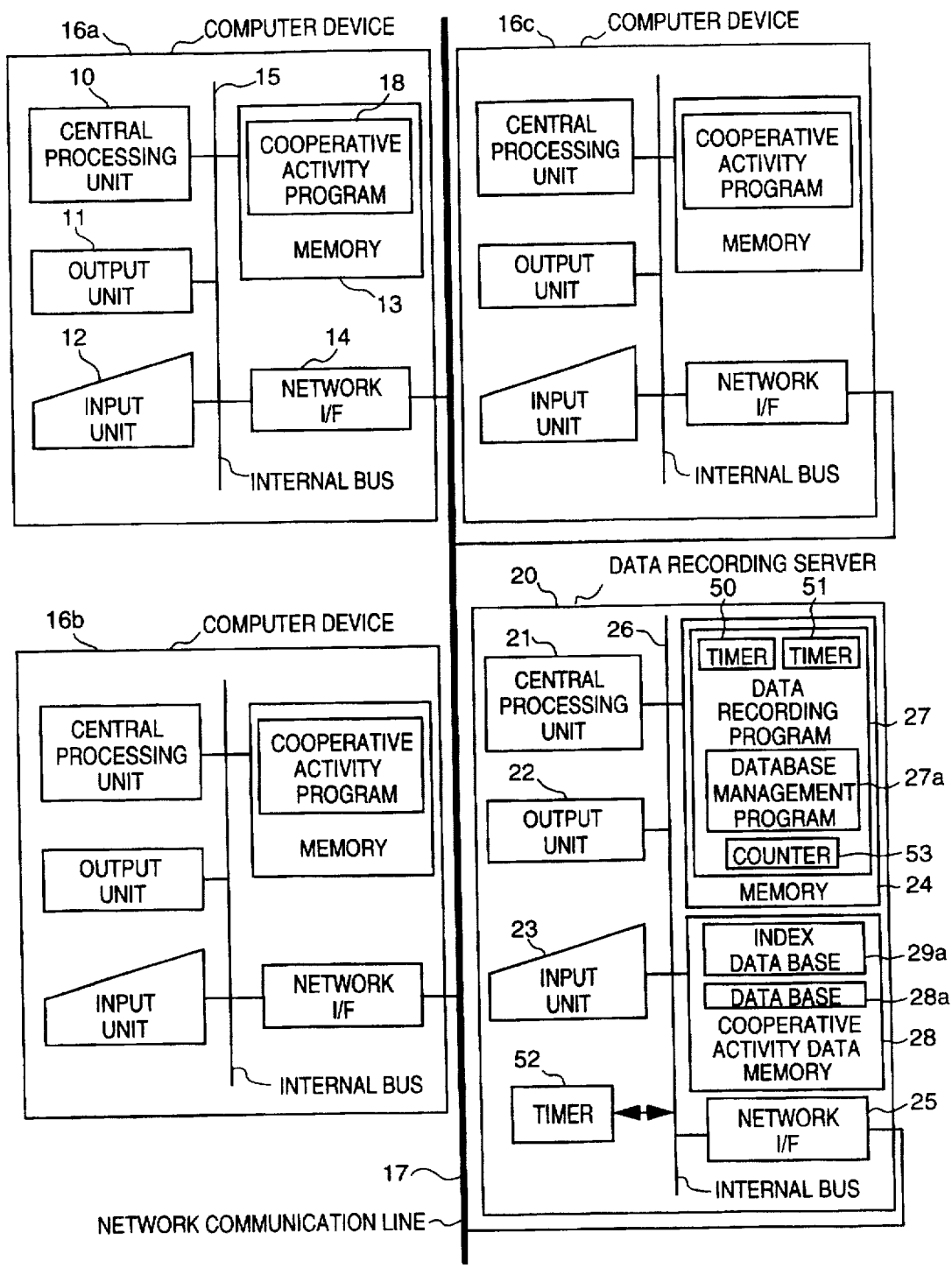
FIG. 7 is a diagram showing the construction of a cooperative activity system according to a second embodiment of the present invention.

In the data recording server 20 of the first embodiment, the data recording program 27 stores keyword tags and cooperative activity data in the memory 28 for cooperative activity data. In the second embodiment, the processing for retrieving the stored data is executed using a database management program 27a (FIG. 7). The configuration of a system which implements the second embodiment is shown in FIG. 7, in which components similar to those of FIG. 1 are designated by the same reference characters and will not be described again.

In the second embodiment, the data recording program 27 in memory 24 of the data recording server 20 is a data record program unique to the second embodiment. The database management program 27a is placed in the memory 24 and is run to implement the second embodiment. Further, the memory 28 is managed by the database management program 27a.

In the second embodiment, an index database 29a, rather than the index database 29, is placed in the memory 28, and a database 28a in which data is recorded, is also placed in the memory 28. Both are managed by the database management program 27a. Further, the data recording program that has been stored in the memory 24 of the second embodiment saves accepted data in the database 28a in the order in which it has been received. The data stored in the database 28a have a structure in which a field to store a sequence number representing the order of receiving is added to the structure shown in FIG. 3.

The counter 53 is used in order to hold the sequence number, just as in the case of the data recording program 27. Since the operation of the data recording program in the second embodiment is almost the same as the operation of the data recording program 27 of the first embodiment, this will be described with reference to FIGS. 5 and 6. Only operations different from those of the data recording program 27 in the first embodiment will be described.

Figure 5:
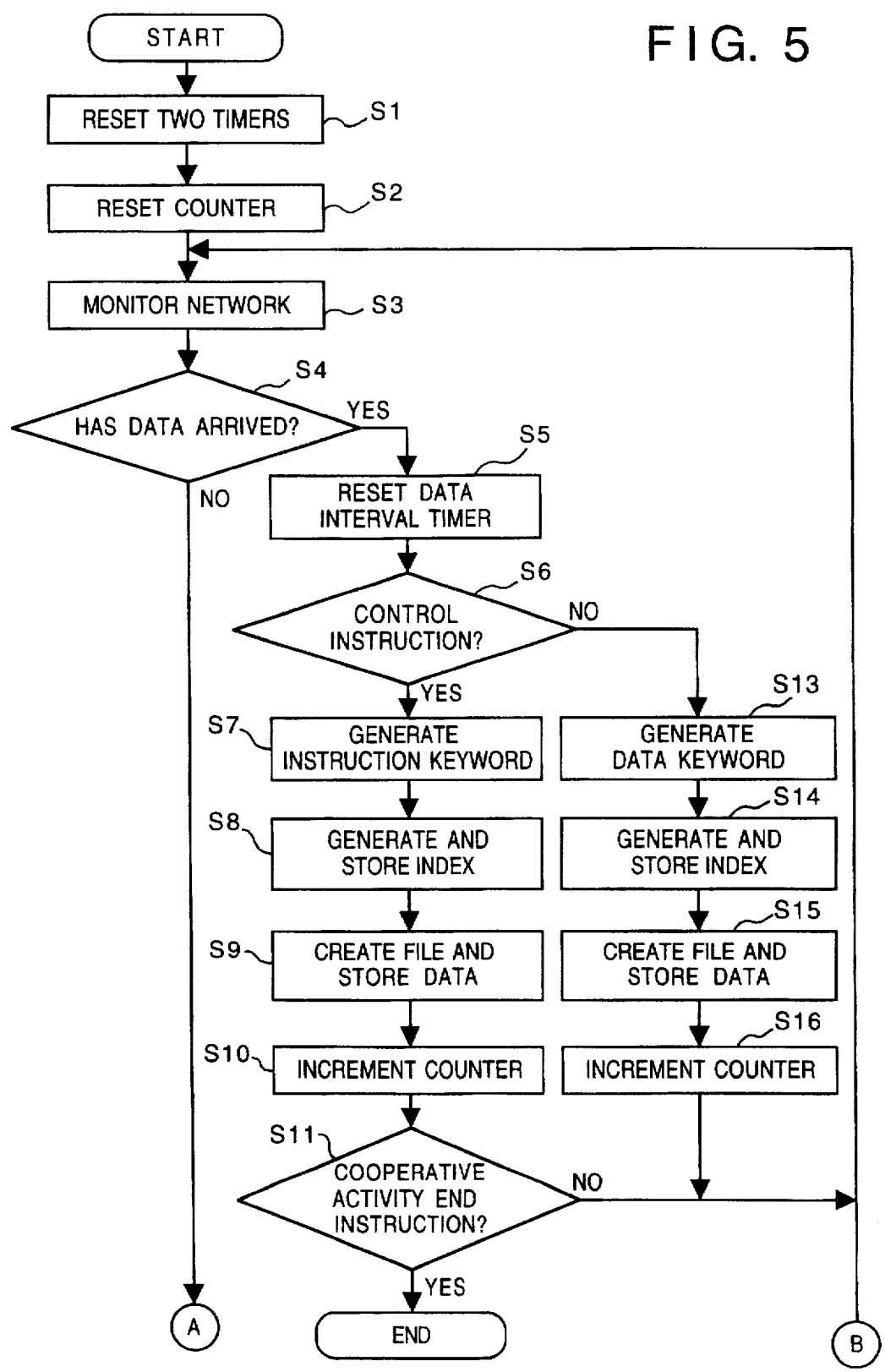
FIG. 5 is a flowchart showing the operation of a data recording program according to an embodiment of the invention.

Steps S8 and S9 in FIG. 5 are replaced by the processing described below.

Step S8 is replaced by processing according to which the keyword tag and sequence number generated at step S7 are recorded in the index database 29a of the memory 28. The type of index key is "cooperative-activity suspension instruction from A", by way of example. Next, at step S9, a query is issued to the database maintenance program 27a in order that the value in counter 53 is added as a sequence number to the data and the data is stored in a data record within the database referred to by the created index key.

Steps S14 and S15 in FIG. 5 are replaced by the processing described below.

The keyword tag and sequence number generated at step S13 are stored in the index database 29a. The type of index key is "audio data from A", by way of example. Next, at step S15, a query is issued to the database management program 27a in order that the value in counter 53 is added as a sequence number to the data and the data is stored in a data record within the database 28a referred to by the created index key.

Figure 6:
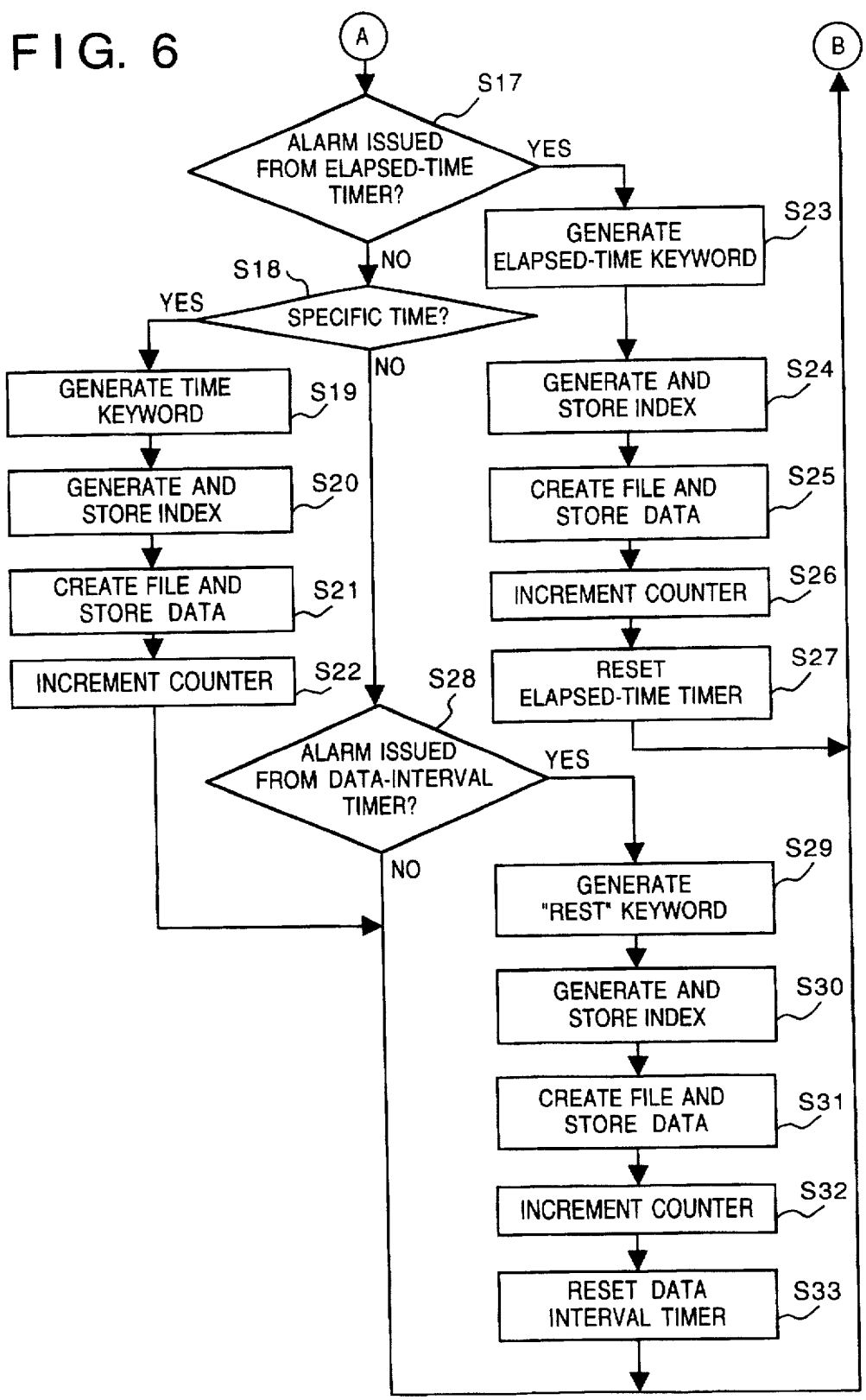
FIG. 6 is a flowchart showing the operation of a data recording program according to an embodiment of the invention.

Steps S24 and S25 in FIG. 6 are replaced by the processing described below.

The keyword tag and sequence number generated at step S23 are stored in the index database 29a. The type of index key is "lapse of 20 minutes", by way of example. Next, at step S25, a query is issued to the database management program 27a in order that the value in counter 53 is added as a sequence number to the data and the data is stored in a data record within the database 28a referred to by the created index key. The content of data stored is the same as that of the data at step S25 in the first embodiment.

Steps S20 and S21 in FIG. 6 are replaced by the processing described below.

The keyword tag and sequence number generated at step S19 are stored in the index database 29a. The type of index key is "15:30", by way of example. Next, at step S21, a query is issued to the database management program 27a in order that the value in counter 53 is added as a sequence number to the data and the data is stored in a data record within the database 28a referred to by the created index key. The content of data stored is the same as that of the data at step S21 in the first embodiment.

Steps S30 and S31 in FIG. 6 are replaced by the processing described below.

The keyword tag and sequence number generated at step S29 are stored in the index database 29a. The type of index key is "rest", by way of example. Next, at step S31, a query is issued to the database management program 27a in order that the value in counter 53 is added as a sequence number to the data and the data is stored in a data record within the database 28a referred to by the created index key. The content of data stored is the same as that of the data at step S31 in the first embodiment.

Thus, in accordance with the second embodiment, the effects of the first embodiment are supplemented by the fact that efficient retrieval of data can be performed using a processing function in which a query is sent to the database management program 27a. Furthermore, in the second embodiment, a sequence number field is attached to the data structure 30 (FIG. 3) transferred through the network 17 and this is stored in the database 28a as is. However, among the fields of the data structure 30, it is possible for a set of values of each field from 31 to 33 and sequence numbers to be stored in the index database 29a and for only the field 34, which is the body of the data, to be stored in the database 28a. A key based upon a set of values of each field becomes, e.g., "cooperative activity suspension instruction-participant A-15:23-123" (where "123" is an example of a sequence number). In this case, in order to extract data from the database 28a, the values in the fields from 31 to 33 are extracted from the key of the index database 29a and broken down, the field 34 (the body of the data) is extracted from the database 28a and they are reconstructed in the data structure 30.

Further, in the second embodiment, the sequence of data depends upon the value in the sequence number field in the data. However, this does not impose a limitation upon the present invention. In a case where use is made of a database management program 27a in which a flexible data structure such as an object-pointing database can be adopted, the data is provided with a pointer field which refers to the data preceding or succeeding to the data and consecutive items of data are made as a bidirectional list, whereby retrieval of consecutive items of data can be performed at high speed.

[Third Embodiment]

According to a third embodiment of the invention, the operation performed by the data recording server 20 in the first embodiment is distributed to and executed by the computer devices 16a–16c.

Figure 8:
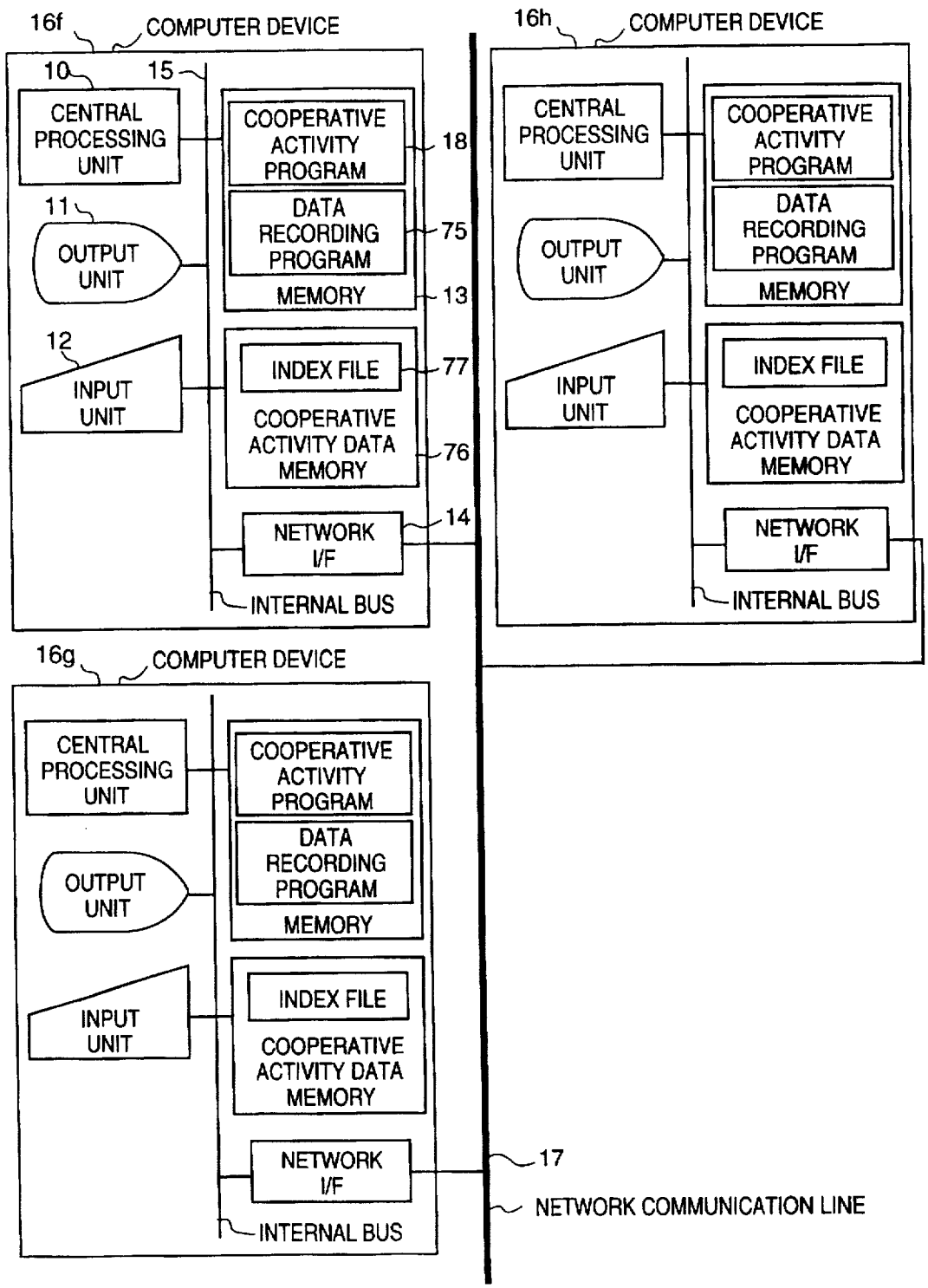
FIG. 8 is a diagram showing the construction of a cooperative activity system according to a third embodiment of the present invention.

FIG. 8 is a diagram showing an example of a system configuration for implementing the third embodiment of the invention.

Components similar to those shown in FIG. 1 are designated by the same reference characters and will not be described again. In addition to the cooperative activity program 18, a data recording program 75 is placed in the memory 13 of each of the computer devices 16f~16h and the program is run. Further, a memory 76 for storing cooperative activity data is connected to each of the computer devices 16f~16h, and an index file 77 is placed in the memory 76.

Since the operation of the data recording program 75 is almost the same as the operation of the data recording program 27 of the first embodiment, this will be described with reference to FIGS. 5 and 6. Only operations different from those of the data recording program 27 in the first embodiment will be described.

In the processing corresponding to step S3 in FIG. 5, a computer device monitors only the data which each of the computer device itself has sent to the network. Further, storage of data in the memory 28 at each step is replaced by storage of data in the memory 76, and storage of data in the index file 29 of the first embodiment is replaced by storage of data in the index file 77. The two timers 50, 51 and the counter 53 are performed by the data recording program 75 of each of the computer devices 16f~16h.

In this embodiment, cooperative activity data sent to the network 17 is stored, for each computer device, i.e., for each participant in a cooperative activity, in order of elapsed time in a separate file upon being given the file name of a sequence number, and the index file 77 is created. The scene of a cooperative activity can be reproduced, by the procedure described below, from the data thus stored.

First, criterion data of a scene to be reproduced is retrieved and extracted from data stored in the computer device itself or from data stored in the computer device of another participant via the network. Next, the time in a transmission time field of the data is extracted, and data in the vicinity of this time is retrieved and extracted from the data of all computer devices participating in the cooperative activity. All of the data thus extracted is sorted in the order of time based upon the values of the times in the transmission time field, and the sorted data is sent to the cooperative activity program 18.

Further, in the third embodiment, only data sent by the computer device itself is monitored, and therefore the load upon the computer device is reduced. Since a small memory capacity suffices for the memory 76 storing cooperative activity data, an inexpensive system can be constructed.

In a case where a failure occurs in the network, it is possible to leave at least the recording of the computer device itself.

Furthermore, by using the third embodiment together with the first embodiment, participants in the cooperative activity can leave individual recordings separate from the overall recording. In a case where it is not possible to participate in a cooperative activity such as a television conference, messages or the like can be stored in advance using the third embodiment, the stored data can be reproduced at the time of the television conference and the messages can be communicated.

[Fourth Embodiment]

In a fourth embodiment of the invention, only a keyword tag stored by each computer device in the third embodiment is stored in the data recording server 20. The system configuration for implementing the fourth embodiment is substantially the same as that of FIG. 1 and therefore the embodiment will be described with reference to FIG. 1. The differences between the fourth embodiment and the foregoing embodiment are as follows: In addition to the cooperative activity system program 18, a data recording program is placed in the memory 13 of each of the computer devices 16a~16c, and the program is running. A cooperative activity data memory is connected to each of the computer devices 16a~16c, and an index file is placed in the cooperative activity data memory. Furthermore, the data recording program of the data recording server 20 is peculiar to the fourth embodiment.

Since the operation of the data recording program stored in the server 20 of the fourth embodiment is almost the same as the operation of the data recording program 75 of the third embodiment, this will be described with reference to FIGS. 5 and 6. Only operations different from those of the data recording program 75 in the third embodiment will be described.

The following steps are added immediately following each of steps S8, S14 of FIG. 5 and steps S20, S24, S30 of FIG. 6:

First, a keyword tag created at the immediately preceding step, the value (file name) in the counter 53 and data indicative of the sender (its own computer device) are sent to the data recording server 20 via the network 17. The data recording program of the server 20 reads out a set of a keyword, sender and identifier sent from the network 17 and stores the set in the memory 28 in the order of elapsed time as the file of a file name based upon a sequence number. Furthermore, an index comprising the keyword and file name is recorded in the index file 29 using a technique such as the binary tree.

Thus, in the fourth embodiment, the effects of the third embodiment are supplemented by the fact that since keyword tags are concentrated in the data recording server 20, it suffices to make a query to only the server 20. Further, the access to actual data that has been stored in the computer devices 16a~16c is possible by using the data of the sender and file name. Since the time sequence of the overall cooperative activity is maintained, reproduction of the overall cooperative activity is possible without making a query of each computer device in the order of the data.

[Fifth Embodiment]

Figure 9:
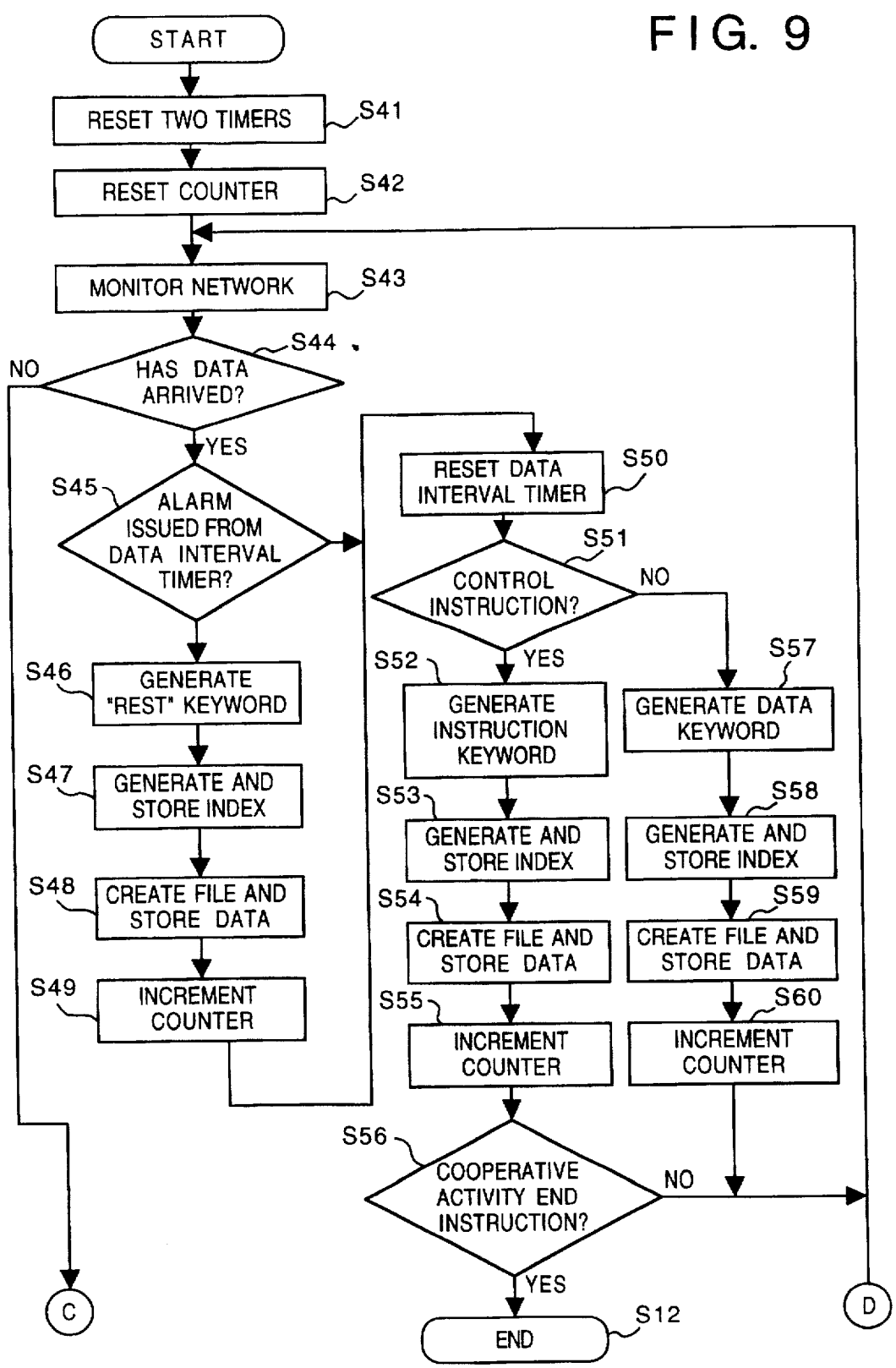
FIG. 9 is a flowchart showing the operation of a data recording program according to a fifth embodiment of the invention.
Figure 10:
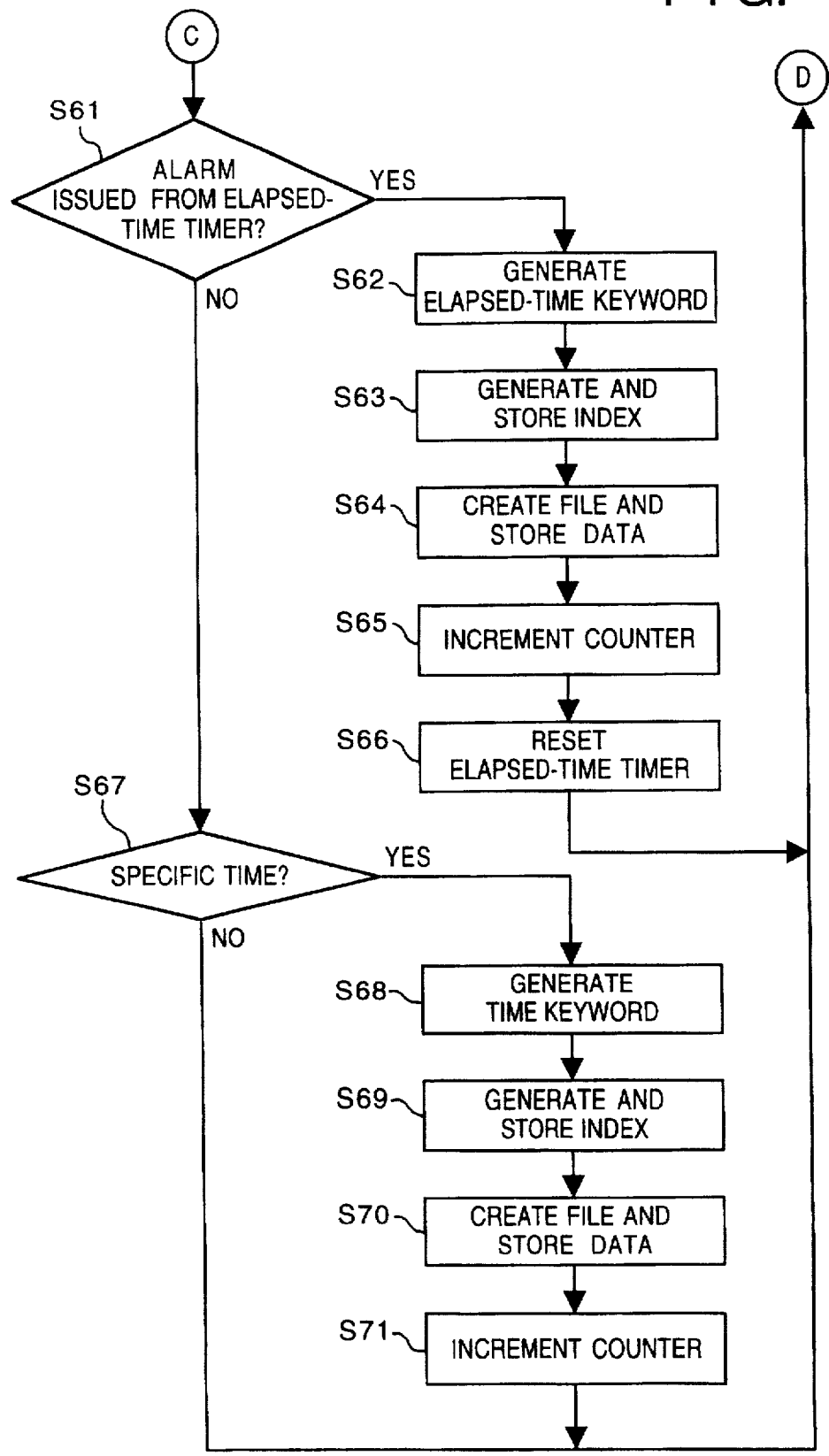
FIG. 10 is a flowchart showing the operation of a data recording program according to a fifth embodiment of the invention.

A fifth embodiment of the invention will now be described. This embodiment is an improvement on the method of adding the "rest" keyword tag of the first embodiment. The system configuration for implementing the fifth embodiment is substantially the same as that of FIG. 1 and therefore the embodiment will be described with reference to FIG. 1. The fifth embodiment differs in that the data recording program 27 in the memory 24 of the server 20 is a data recording program specific to the fifth embodiment. The operation of the data recording program of the fifth embodiment will be described with reference to FIGS. 9 and 10. In FIGS. 9 and 10, steps S41~S44 are the same as steps S1~S4, and steps S50~S71 are substantially the same as steps S5~S27 in FIGS. 5 and 6.

It is determined at step S44 in FIG. 9 whether data has arrived. If the answer is "YES", then the program proceeds to step S45, at which the data-interval timer 51 is checked. If the set time has not elapsed in the timer 51 and the timer 51 has not issued an alarm, then the program proceeds directly to step S50. If the alarm has been issued, then the program proceeds to step S46, at which the keyword tag "rest" indicating that the participant is thinking is created. Next, at step S47, this is recorded in the key field 41 of the index structure 40 (FIG. 4), the value in counter 53 is written in the pointer field 42, and the index is added to the index file 29 of the server 20 using a technique such as the binary-tree method.

The program then proceeds to step S48, at which a file having the value in counter 53 as its name is created. The data type "rest" is written in field 31, the field 32 is left blank, the current time is written in field 33, and time data indicating "rest" is written in field 34. Next, at step S49, the counter 53 is incremented and the program proceeds to step S50. It should be noted that the other processing steps of FIGS. 9 and 10 are similar to those of FIGS. 5 and 6 and need not be described again.

In accordance with the fifth embodiment, the effects of the first embodiment are supplemented by the fact that the keyword tag "rest" stored is only one even in a case where the interval is more than twice the time set in the data interval timer 51.

[Sixth Embodiment]

A sixth embodiment of the invention will now be described. According to the sixth embodiment, the cooperative activity data recorded in the cooperative activity data memory 28 of the server 20 in the first embodiment is recorded in an external recording unit, such as a video tape recorder, of the server 20. The system configuration for practicing the sixth embodiment is illustrated in FIG. 11.

Figure 11:
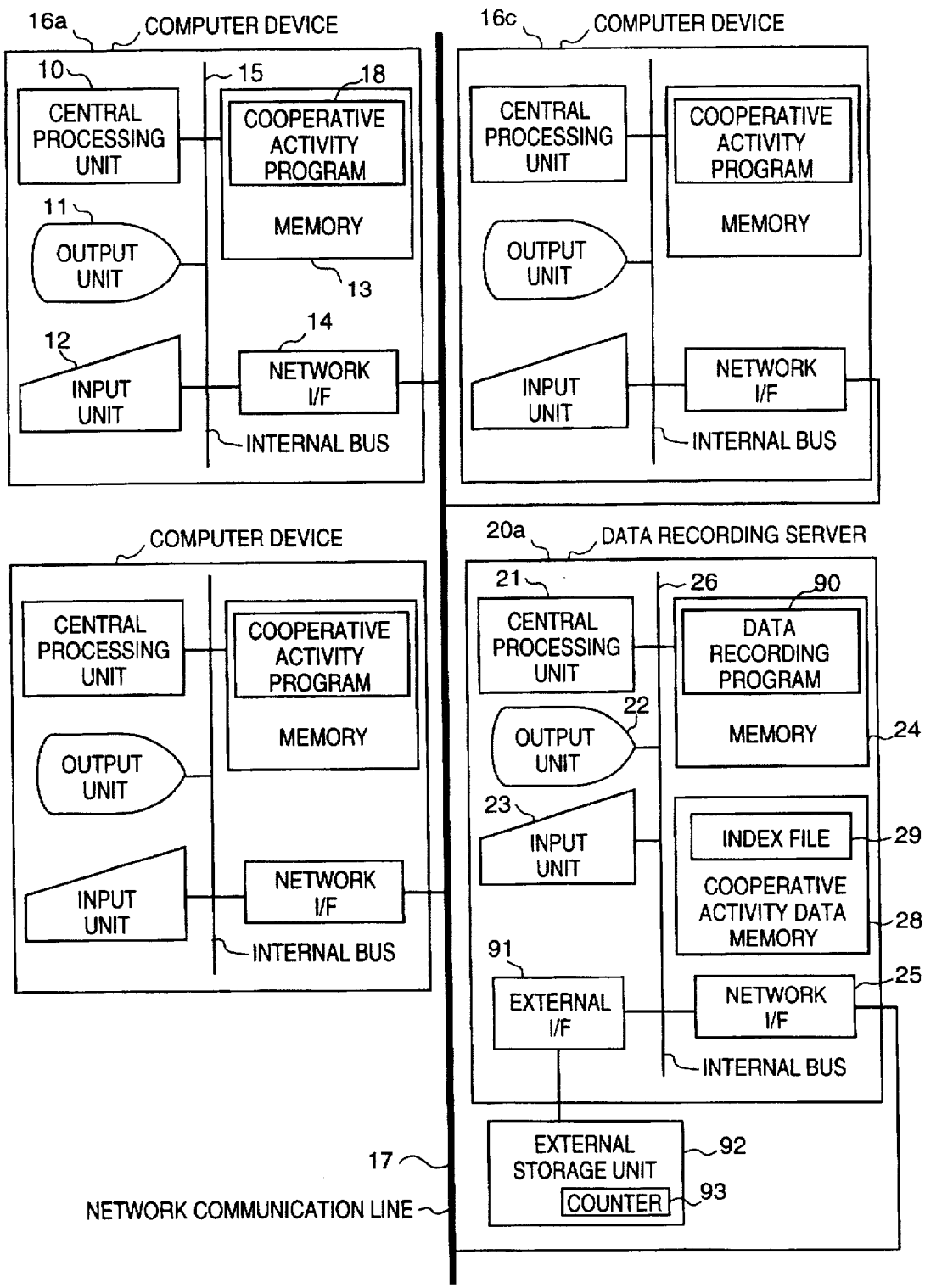
FIG. 11 is a diagram showing the construction of a cooperative activity system according to a sixth embodiment of the present invention.

Components in FIG. 11 similar to those shown in FIG. 1 are designated by the same reference characters and will not be described again.

A data recording program 90 is unique to the sixth embodiment. An external storage unit 92 such as a video tape recorder or a writable optical/magneto-optical disk connected via an external interface 91 of the server 20a. The external storage unit 92 has a counter 93 incremented in conformity with elapsed time or the amount of tape used. Besides image/audio data, a control instruction of the external storage unit 92 and the value in the counter 93 are exchanged by the server 20a and external storage unit 92. Since the operation of the data recording program is substantially the same as that of the data recording program 27 of the first embodiment, this will be described with reference to FIGS. 5 and 6. Only operation that differs from that of the data recording program 27 will be described.

First, the data recording program 90 of the sixth embodiment does not have the counter 53 of the first embodiment holding the sequence number. At step S2 in FIG. 5, the external storage unit 92 is initialized without resetting the timer 53. For example, the counter 93 of the external storage unit 92 is reset to "0", the output of image/audio data to the output unit 11 of the server 20a is distributed and converted, and the operation for sequentially recording the data in the external storage unit 92, namely video recording/sound recording, is started.

At steps S8, S14, S20, S24 and S30 in FIGS. 5 and 6, the keyword tag generated at the immediately preceding step is written in the key field 41 of the index structure 40. Next, the value in the counter 93 of the external storage unit 92, in place of the value in the counter 53, is read out and this value is written in the pointer field 42. This index is stored in the index file 29 using a technique such as the binary tree. Since the counter 93 is counted up almost always by the external storage unit 92, the steps S10, S16, S22, S26 and S32 may be deleted. Immediately after the program, i.e., immediately before step S12, processing for distributing and converting the image/audio output to the output unit 11 of the server 20 and for ending the storage in the external storage unit 92 is added.

In accordance with the sixth embodiment, as described above, image/audio of a cooperative activity outputted to the output unit 11 of the computer device is continuously distributed to the external storage unit 92 such as the video tape recorder until the activity ends, and storage is performed after the necessary data conversion is applied. Furthermore, a keyword tag the same as that of the first embodiment is recorded in the index file 29 together with the value in the counter 93 of the external storage unit 92. Accordingly, the index file 29 is retrieved from the keyword tag and the data of the external storage unit 92 is reproduced from the position of the value of counter 93 obtained by the retrieval. As a result, the image/audio of continuous scenes of the cooperative activity is reproduced. It should be noted that steps S9, S15, S21, S25, S31 may be deleted and that solely reproduction of a moving picture/audio can be made possible without performing a reproduction operation. In this case, the storage of network transfer data (protocol) is unnecessary and the capacity of the cooperative activity data memory 28 may be reduced.

Further, an example has been illustrated in which the recording of video and audio is performed using the external storage unit 92. However, the output image/audio of the output unit 11 may be digitized and the digital data may be stored in the cooperative activity data memory 28. In this case, the data storage location, e.g., the number of offset bytes from the beginning of the data, may be used instead of the counter 93.

In the sixth embodiment, an index based upon keyword tags can be utilized while making use of an inexpensive storage unit or storage medium for the storage of a large quantity of image/audio data. By using a storage unit that is external to the computer device, the load upon the computer device is reduced.

Figure 12:
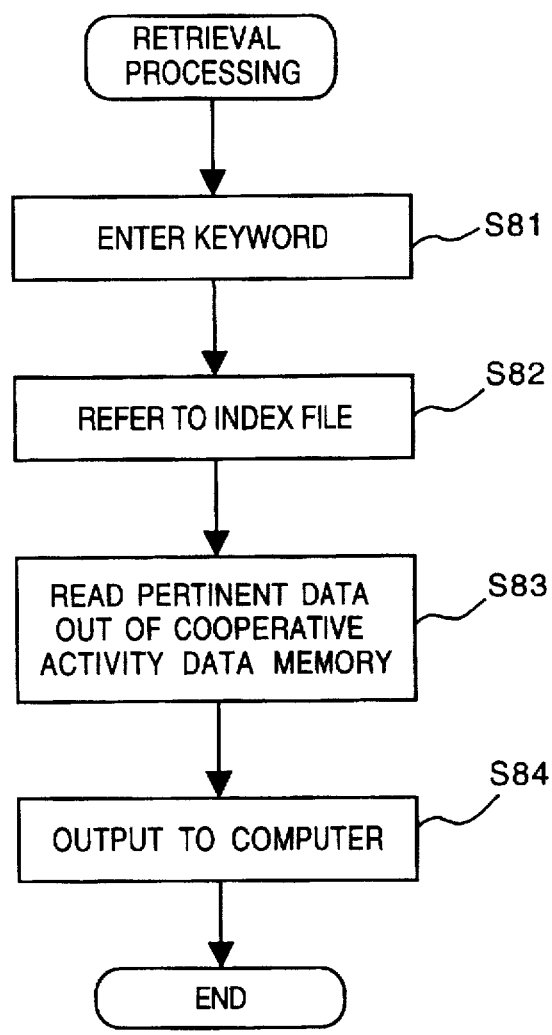
FIG. 12 is a flowchart showing retrieval processing.

FIG. 12 is a flowchart showing retrieval processing executed by the servers 20, 20a in the foregoing embodiments. In a case where each computer device stores cooperative activity data, as in the third embodiment, the retrieval processing is capable of being executed by each computer device.

The processing of FIG. 12 is started by a retrieval command from the input unit 23 or from any of the computer devices connected via the network 17. At step S81, the entered keyword is accepted and the index table 29 is referred to using the keyword to obtain the storage location of the cooperative activity data stored in the memory 28. The data corresponding to the keyword is read out of the memory 28, the read data is outputted to the computer device to which the retrieval command was applied and retrieval processing is ended. When the data is stored in database, as in the second embodiment, the index file 29 is replaced by the index file 29a, and the cooperative activity data memory 28 is replaced by the cooperative activity data memory 28a. Other processing is performed in the same manner.

In accordance with this embodiment, as described above, the contents of a cooperative activity are stored in sequence while a keyword or tag useful in a subsequent editing operation is added onto by the system at the same time that the cooperative activity proceeds. As a result, reproduction of the cooperative activity is made possible and the amount of work in editing or the like following the cooperative activity can be reduced while the cooperative activity proceeds smoothly.

Cooperative activity data in this embodiment is stored in the order in which it is sent to the network 17, and high-speed retrieval is possible using keyword tags of the sender of data, the type of data, the type of control instruction, elapsed time, absolute time and "rest".

Furthermore, from data that has thus been retrieved, retrieval of data in the vicinity of this data is performed with ease. By resending stored continuous data to the cooperative activity program, it is possible to reproduce the scene of a cooperative activity.

Thus, this embodiment solves the problem encountered in the prior art, in which, in order to attach a keyword tag at the same time as the recording of data when a cooperative activity is being performed, the cooperative activity or thought is interrupted and a full-time clerk is required. As a result of this embodiment, a cooperative activity can be performed in an efficient manner.

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides a case where the aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

The present invention can be applied to a system constituted by a plurality of devices or to an apparatus comprising a single device. Furthermore, it goes without saying that the invention is applicable also to a case where the object of the invention is attained by supplying a program to a system or apparatus. In such case, the storage medium on which the program of the invention has been stored constitutes the invention. By reading the program out of the storage medium and sending it to a system or apparatus, the system or apparatus operates in the predetermined manner.

As many apparently widely different embodiments of the present invention can be made without departing from the spirit and scope thereof, it is to be understood that the invention is not limited to the specific embodiments thereof except as defined in the appended claims.

What is claimed is:

1. A cooperative activity system in which a plurality of computer devices are connected to a network, data exchange between computer devices is performed via the network and an activity is performed by cooperation of computer devices, comprising:

monitoring means for monitoring the network and detecting data for a cooperative activity transferred from one of the computer devices via the network;

timekeeping means for measuring time and generating time data when a measured time satisfies a predetermined condition;

number applying means for applying a serial number to each of the data for the cooperative activity detected by said monitoring means and the time data generated by said timekeeping means, in accordance with the order of the appearance of the data or the time data;

keyword preparing means for preparing a keyword for each of the data for the cooperative activity detected by said monitoring means and the time data generated by said timekeeping means;

index creating means for creating an index in which each keyword is associated with the serial number applied to each of the data and the time data corresponding to each keyword; and cooperative activity data storage means for storing the data and the time data each of which the serial number has been applied and the index created by said index creating means.

2. The system according to claim 1, wherein said keyword preparing means prepares a keyword with respect to the data for the cooperative activity by processing content of data transferred through the network.

3. The system according to claim 2, wherein the data for the cooperative activity includes information indicative of at least one of a beginning and an end of a cooperative activity, addition and deletion of a participant, and start-up and end of a shared application.

4. The system according to claim 1, wherein said timekeeping means measures an elapsed time of a cooperative activity and said keyword preparing means prepares a keyword representing the elapsed time measured by said timekeeping means.

5. The system according to claim 1, wherein said timekeeping means measures a present time during a cooperative activity and generates the time data when the present time reaches a predetermined time, and said keyword preparing means prepares a keyword representing the present time measured by said timekeeping means.

6. The system according to claim 1, wherein said timekeeping means has detecting means for detecting a state in which the data of a cooperative activity has not been transferred for a period of time greater than a prescribed period of time and said keyword preparing means prepares a keyword representing in a case where the data of the cooperative activity has not been transferred for the period of time.

7. The system according to claim 1, wherein said cooperative activity data storage means stores the index in an index file.

8. The system according to claim 1, wherein said cooperative activity data storage means stores data in each computer device participating in the cooperative activity.

9. A cooperative activity system in which a plurality of computer devices are connected to a network, data exchange between computer devices is performed via the network and an activity is performed by cooperation among the plurality of computer devices, said system having a server connected to each of said plurality of computer devices, via said network, in such a manner that data can be exchanged, said server comprising:

monitoring means for monitoring the network and detecting data for a cooperative activity transferred from one of the computer devices via the network;

timekeeping means for measuring time and generating time data when a measured time satisfies a predetermined condition;

number applying means for applying a serial number to each of the data for the cooperative activity detected by said monitoring means and the time data generated by said timekeeping means, in accordance with the order of the appearance of the data or the time data;

keyword preparing means for preparing a keyword for each of the data for the cooperative activity detected by said monitoring means and the time data generated by said timekeeping means;

index creating means for creating an index in which each keyword is associated with the serial number applied to each of the data and the time data corresponding to the each keyword; and cooperative activity data storage means for storing the data and the time data to each of which the serial number has been applied and the index created by said index creating means.

10. The system according to claim 9, wherein said keyword preparing means prepares a keyword with respect to the data for the cooperative activity by processing content of data transferred through the network.

11. The system according to claim 10, wherein the data for the cooperative activity includes information indicative of at least one of a beginning and an end of a cooperative activity, addition and deletion of a participants and start-up and end of a shared application.

12. The system according to claim 9, wherein said timekeeping means measures an elapsed time of a cooperative activity and said keyword preparing means prepares a keyword representing the elapsed time measured by said timekeeping means.

13. The system according to claim 9, wherein said timekeeping means measures a present time during a cooperative activity and generates the time data when the present time reaches a predetermined time, and said keyword preparing means prepares a keyword representing the present time measured by said timekeeping means.

14. The system according to claim 9, wherein said timekeeping means has detecting means for detecting a state in which data of a cooperative activity has not been transferred for a period of time greater than a prescribed period of time and said keyword preparing means prepares a keyword representing "rest for thought" in a case where the data of the cooperative activity has not been transferred for the period of time greater than the prescribed period of time.

15. The system according to claim 9, wherein said cooperative activity data storage means stores the keyword in each of the computer devices participating in the cooperative activity and in said server.

16. The system according to claim 9, wherein said cooperative activity data storage means stores a video image and audio, which are outputted to the computer device, in a storage device connected to said server.

17. A cooperative activity method in which a plurality of computer devices are connected to a network, data exchange between computer devices is performed via the network and an activity is performed by cooperation of computer devices, said method comprising:

a monitoring step of monitoring the network and detecting data for cooperative activity transferred from one of the computer devices via the network;

a timekeeping step of measuring time and generating time data when a measured time satisfies a predetermined condition;

a number applying step of applying a serial number to each of the data for the cooperative activity detected in said monitoring step and the time data generated in said timekeeping step, in accordance with the order of the appearance of the data or the time data;

a keyword preparing step of preparing a keyword for each of the data for the cooperative activity detected in said monitoring step and the time data generated in said timekeeping step;

an index creating step of creating an index in which each keyword is associated with the serial number applied to each of the data and the time data corresponding to each keyword; and a cooperative activity data storage step of storing the data and the time data to each of which the serial number has been applied and the index created in said index creating step.

18. The method according to claim 17, wherein a keyword is prepared with respect to the data for the cooperative activity by processing content of data transferred through the network.

19. The method according to claim 18, wherein the data for the cooperative activity includes information indicative of at least one of a beginning and an end of a cooperative activity, addition and deletion of a participant, and start-up and end of a shared application.

20. The method according to claim 17, wherein, in said timekeeping step, an elapsed time of a cooperative activity is measured, and said keyword is prepared as a keyword representing the elapsed time measured.

21. The method according to claim 17, wherein, in said timekeeping step, a present time is measured during a cooperative activity and the time data is generated when the present time reaches at a predetermined time, and said keyword being prepared as a keyword representing the present time.

22. The method according to claim 17, wherein, in said timekeeping step, a state in which the data of a cooperative activity has not been transferred for a period of time greater than a prescribed period of time is detected, said keyword being a keyword representing in a case where the data of the cooperative activity has not been transferred for the period of time greater than the prescribed period of time.

* * * * *

UNITED STATES PATENT AND TRADEMARK OFFICE
CERTIFICATE OF CORRECTION

PATENT NO. : 5,768,514

DATED : June 16, 1998

INVENTOR(S): YOICHI KAMEI

It is certified that error appears in the above-identified patent and that said Letters Patent is hereby corrected as shown below:

IN THE DRAWINGS

Sheet 2, FIG. 2, "FIG. 2" should read --FIG. 2 PRIOR ART--.

COLUMN 1

Line 16, "a" (first occurrence) should be deleted.

COLUMN 3

Line 41, "EMBODIMENTS Preferred" should read --EMBODIMENTS ¶ Preferred--.

COLUMN 6

Line 13, Close up left margin.

COLUMN 10

Line 2, "In" should read --in--.

COLUMN 13

Line 14, "be also" should read --also be--; and
Line 48, "such" should read --such a--.

UNITED STATES PATENT AND TRADEMARK OFFICE
CERTIFICATE OF CORRECTION

PATENT NO. : 5,768,514

DATED : June 16, 1998

INVENTOR(S): YOICHI KAMEI

It is certified that error appears in the above-identified patent and that said Letters Patent is hereby corrected as shown below:

COLUMN 14

Line 17, "data" (second occurrence) should read
--data to--; and

Line 44, "representing" should read
--representing "rest for thought"--.

COLUMN 15

Line 12, "the" (third occurrence) should be deleted; and

Line 25, "participants" should read --participant,--.

COLUMN 16

Line 44, "at" should be deleted;

Line 51, "representing" should read
--representing "rest for thought"--.

Signed and Sealed this

Sixth Day of April, 1999

Attest:

Q. TODD DICKINSON

*Attesting Officer*    Acting Commissioner of Patents and Trademarks